Dec. 29, 1936.  J. H. VAN UUM  2,065,843
SECURING DEVICE FOR CABLES OR THE LIKE
Filed Sept. 12, 1932  2 Sheets-Sheet 1

INVENTOR
John H. Van Uum,
BY Justin W. Macklin
ATTORNEY

Dec. 29, 1936.    J. H. VAN UUM    2,065,843
SECURING DEVICE FOR CABLES OR THE LIKE
Filed Sept. 12, 1932    2 Sheets-Sheet 2

INVENTOR
John H. Van Uum
BY Justin W. Macklin
ATTORNEY

Patented Dec. 29, 1936

2,065,843

UNITED STATES PATENT OFFICE 2,065,843

SECURING DEVICE FOR CABLES OR THE LIKE

John H. Van Uum, Lakewood, Ohio

Application September 12, 1932, Serial No. 632,655

6 Claims. (Cl. 24—73)

The invention relates to spring clip securing devices of that character having an embracing or receiving eyelet portion and a pair of spring wedges adapted to pass through and be embraced by a hole in a supporting member. More particularly, the invention relates to securing devices for cables, conduits, or the like, to be held against the supports such as sheet or strip metal, having openings therein to receive and hold operative spring legs of the device. A specific illustration of the use of my invention is the securing of conduits, commonly called cables, for the starting and lighting wires of automobiles to the frame, body and like parts. In a like manner gas lines and other pipe may be so secured.

The objects of the invention are the provision of a simple, effective device capable of being very easily attached or assembled upon the cable and snapped into position in the support, and which shall afford a very secure attachment tightly and firmly holding the cable against the support. In the automobile use mentioned it is essential that the cables shall be so securely and firmly held that vibration, slipping, or any relative movement between the cable and support be entirely eliminated. If such vibration or slippage occurs, dangerous wear may result, and even permitting slight movement may result in offensive noise in passenger car usage.

In securing such cable, for example, to the frame of an automobile, tests are often applied to determine whether the clips or securing devices will withstand a given number of pounds pull, for example, 25 to 40 pounds lateral pull on the cable, failing in which the device is rejected. It is a specific object of the invention, therefore, to make such a device which may not only be easily applied but which when in position will so securely hold the cable as to amply meet any such tests or resist accidental pulls or strains applied thereto.

In carrying out the above invention I provide a single strip of spring steel having a portion looped around and tightly embracing the member to be supported and portions extending outwardly from the loop, and thence away from each other, and then converging toward each other, and so shaped and formed that when in position engaging the member to be supported and the support as to exert constant outward pressure upon the edges of a round or other shaped opening in the support.

A further specific object is to so shape or form the angles of divergence between the outwardly extending portions as to provide a wedging action drawing the cable or like member toward the support, thus firmly pressing it thereto at all times.

Other objects are to so shape and form the device that it may be made from a single strip of flat steel with a minimum number of die movements and with a maximum utilization of material employed, avoiding waste in the stamping and cutting of the blanks for the clips.

A still more specific object is to so shape and proportion the converging portions of such a clip that they may readily enter the opening in the support and when in position maintain constant contact of their points, so that the spring action is that of the outward bowing tendency effective between the point of contact with the cable or member supported and the touching points of the ends of the strip forming the clip.

It is a still more specific object to so shape and proportion the shoulders engaging the side of the opening of the support away from the cable or like member that this wedging action drawing the cable toward the support shall be constantly effective while permitting a sufficient springing action to permit passing of the shoulders through the opening by the bending occurring between the cable and the ends of the clip, and without releasing the gripping effect upon the cable when in assembled position.

Other more specific objects will become apparent in the following description. The essential characteristics of my invention are summarized in the claims.

Figure 1:
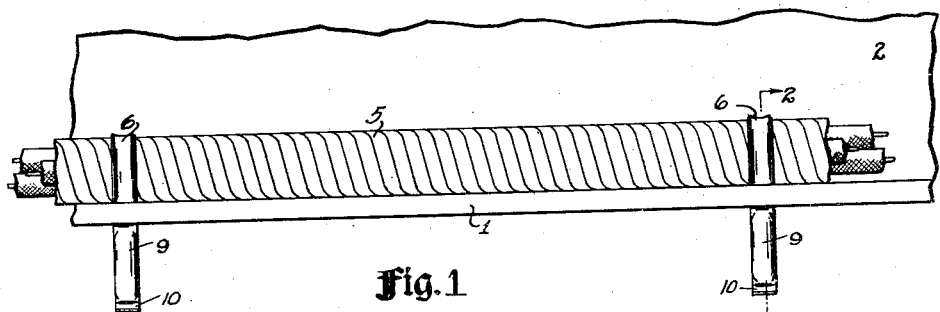
Fig. 1 is a side elevation of two of my clips, in accordance with a preferred form, embracing a wire conduit or cable and securing it to the lower flange of an automobile side frame member.

Describing the drawings by the use of reference characters, 1 indicates the lower flange of a side rail or frame member of an automobile; 2 the web thereon through which are made openings at predetermined distances as indicated at 4. At 5 is indicated a conduit cable having the usual coiled armor exterior.

It is desirable that such cables, gasoline tubes or like parts be carried close to the web and away from the open side of the channel member and it is also desirable that the openings 4 be no larger than necessary, in order that the frame member may not be weakened by the use of such openings therein. For example, a frequent specification for such openings is $\frac{5}{32}''$ maximum diameter for round openings.

Figure 3:
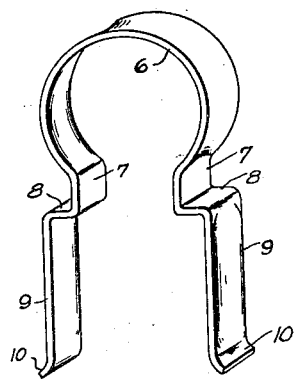
Fig. 3 is an enlarged perspective view of one of my clips before application to the cable.
Figure 2:
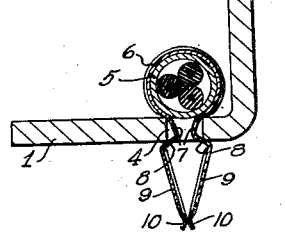
Fig. 2 is a transverse section through one of the clips and a supporting member being taken substantially on a plane indicated on the line 2—2 of Fig. 1.

The form of clip shown in Figs. 1, 2, and 3, is shown as comprising a single, substantially flat strip which is preferably of spring steel and which is formed to provide a loop 6 of a size to closely embrace the armored exterior of the cable 5. This loop extends around the major portion of the cable, so that in position it may substantially completely encircle it, leaving only a narrow gap between outwardly extending members 7 from which the strip again extends outwardly each way as at 8, forming the gripping shoulders joined with the members 9 which terminate, preferably, in outwardly turned lips as at 10. As stated, the length of the member 7, length of the shoulders 8, and the distance between them when in position is predetermined with relation to the cable diameter and support thickness, and it is important that they are so formed as to accomplish the object of gripping the opening in the manner above described and as will more fully hereinafter appear.

The members 9 are preferably slightly rounded outwardly to facilitate their entrance into the openings 4.

Assuming now that the clip be placed upon the cable, it is secured to its support by the simple step of pressing the members 9 together as with the fingers until the points 10 meet, or substantially meet, causing them to enter the opening 4 and then by pressing downwardly either upon the loop or upon the cable, or both; the leg members 9 are wedged toward each other, permitting them to pass through the opening 4. The necessary yielding or bending inwardly occurs by the spring action between the cable and the meeting lips of the ends 10. In this respect the height of the shoulder 8, it will be seen, must not be too great, as the amount of spring in the bridge formed between the end 10 and the cable by either leg is necessarily limited. It will also be noted that when in position this spring in use does urge the shoulders 8 outwardly into close wedging engagement with the bottom of the support at the perimeter or lower edge of the hole 4, thus constantly pulling downwardly against the cable, pressing it against the upper side of the flange 1, or other support. The length of the members 10 is also predetermined to effect approximately the proportions shown, particularly in Fig. 2, so that when in this mounted position the outward springing action of the legs will not bring the members 7 against the sides of the hole to thus bring the wedging action at the limit of its effect, but on the contrary will permit constant wedging effect throughout the life of the use of the fastener.

Preferably, the loop 6 is slightly curved transversely so that the cable may bend with relation to the clip either outwardly or laterally, as may be necessary, or may occur accidentally, without subjecting it to cutting action of the corners of the edges of the strip from which the clip is formed.

Figure 4:
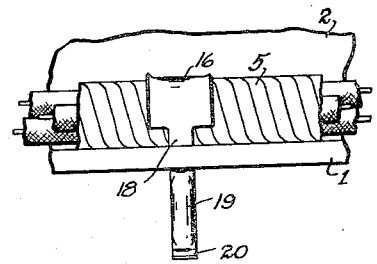
Fig. 4 is a side elevation of one of my clips in active position showing a modified form of the portion embracing the cable.

As a further protection against the likelihood of cutting into the cable and for use where the cable is subjected to more bending action the strip from which the clip is formed may be wider in the first instance and be so cut from the blank as to provide the wide cable embracing portion 16 as shown in the modification of Fig. 4. In this instance the portion 18 is continued from the wider portion 16 and extends to the portion corresponding to that part 7 of the form heretofore described, while the leg portion and ends 19 and 20 may be formed as shown and described in connection with parts 9 and 10.

Figure 6:
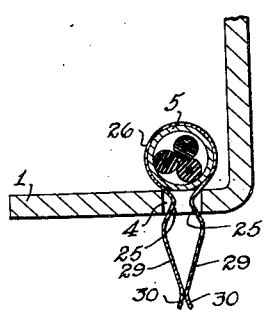
Fig. 6 is a section of the same.

For some uses, particularly that of facilitating more ready removal and where the likelihood of subjecting the part such as the cable to pulling is not great, the shoulders embracing the opening may be less abrupt, as shown in Fig. 6. This type shown in Fig. 6 may be otherwise shaped as the form shown in Fig. 1 or may be entirely flat as the form shown in Fig. 5.

Figure 5:
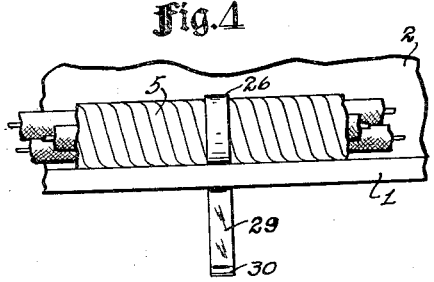
Fig. 5 is a similar view of still another form.

Referring further to Figs. 5 and 6, the loop 26 is of the same width as the leg portions and is usually flat, and it merges more gradually with the converging portion 25 connecting with the legs 29 having the outwardly turned ends 30, facilitating placing the clip over the cable or other article to be supported. This form of the clip may be more readily withdrawn by merely pulling upwardly on the cable, itself, inasmuch as the slope of the shoulders embracing the lower edge of the hole 4 is more gradual, and by the same token the clip may be forced through this hole with much less pressure, which, as stated, in cases where the cable or the like does not need to be held so securely and where ready removal is desired, it may be a more conveniently useful embodiment.

With respect to the other forms, particularly that of Figs. 1, 2, and 3, it is very difficult, if not impossible, to withdraw the clip from the opening without force great enough to break it. Its removal may be accomplished reasonably readily, however, by compressing the legs 9 toward each other by pliers or the like applied from the lower side or side of the support away from the cable and at the same time moving the clip in a direction to withdraw it.

It will also be seen that the cable may be laid closely into a corner as against the web 2 of the channel beam of the side frame, where it is best protected, and yet its ease of assembly and removal are not impaired, as shown in Fig. 2.

Figure 7:
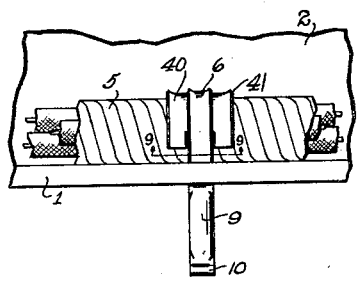
Fig. 7 is a side elevation of the same clip in position with a cable protecting device.
Figure 8:
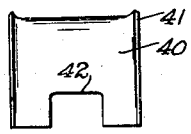
Fig. 8 is a side elevation of this protecting member.
Figure 9:
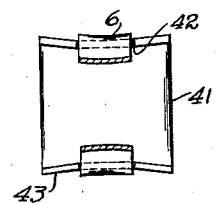
Fig. 9 is a section through the clip member taken substantially in the line 9—9 of Fig. 7.

The arrangement shown in Figs. 7, 8, and 9 is a modification providing the enlarged cable embracing element while still using the clip such as that shown in Figs. 1, 2, and 3, made of a single strip of spring steel of the same width throughout its length. A guard member 40 is here used, comprising a curved flat shield of metal, preferably embracing materially more than half of the cable or tube to be supported, and which may be made of lighter, cheaper material than that of the spring steel, such for example as common tin plate stamped from sheet and preferably having its edges curled upwardly as at 41 and provided with notches 42 engaging the edges of the cable embracing portion of the fastener. The lower corners of the guard being turned outwardly as at 43 in Fig. 9 serve to prevent turning of the guard around the cable beyond a point where these corners would engage the support, such as the flange 1. However, such turning is normally prevented by friction and the engagement of the notches 42 with the cable embracing element 6 of the clip.

The modified form of the use of a clip accomplishing this purpose and formed from a single strip and adapted to enter an opening in the support, and having cable or tube embracing portions may be made by forming the wedge legs at the intermediate portion of the strip while the open ends are shaped to embrace the member to be supported. One form of such an arrangement is illustrated in Fig. 10 where the strip is folded upon itself as at 45 and the legs 49 forming the wedge adapted to enter the opening, while the continuations of this strip are curved to embrace the support by inwardly sloping shoulders 48 and which continue to outwardly extending and preferably downwardly sloping shoulder members 50 from which each side of the strip is folded inwardy upon itself and continues substantially to a meeting point and thence outwardly again to cable or tube embracing members 52, preferably provided with outwardly flared lips 53 here shown as engaging the tube 55.

Figures 10, 11:
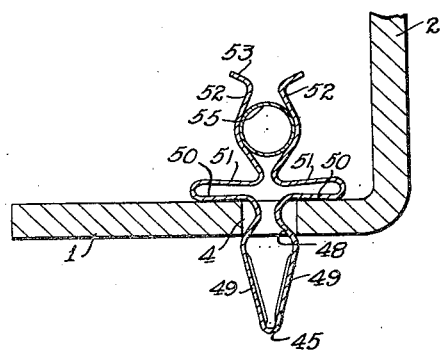
Fig. 10 shows another modified form of such a securing device.
Fig. 11 shows still another form of such a securing device embracing the cable and in position on the support.

It will be seen that the lower portion of this clip in the position shown in Fig. 10 corresponds to the general arrangement of the clips shown in my co-pending application 627,243, filed August 2, 1932, the embracing of the opening 4 in the support being effected in very much the same manner as the clips shown in my co-pending application. However, the folded-over portions 51 permit considerable elasticity or spring action to be effective for embracing the tube or cable while allowing its ready assembly and withdrawal from the supporting clip.

Such a device, however, will not grip the tube or cable to so effectively resist a pull as the forms described in connection with Figs. 1, 2, 3, and 4.

Figure 12:
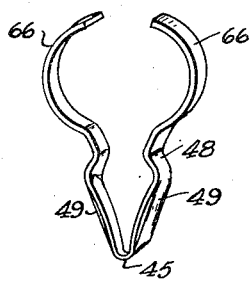
Fig. 12 is a perspective view of the latter form of device.

Another form in which the intermediate portion of the strip comprises the wedge portion adapted to enter the opening 4 while the free ends embrace the cable is that shown in Figs. 11 and 12, the intermediate portion of the strip being bent upon itself as before at 45 and diverging in the spring legs 49, continuing to the shoulders 48 and thence upwardly and to the cable or tube embracing curved portions 66. This form is preferably shaped such that it may be sprung over the cable by spreading the portions 66 slightly from the position shown in Fig. 12 and then when on the cable 6 pressing into the opening 4, causing the members 66 to tightly engage the cable or tube as shown in Fig. 11.

I claim:

1. A cable fastening clip comprising a strip of metal stock formed of resilient spring material, said strip being bent intermediate its ends to provide a cable encircling portion terminating in a pair of arms, the free ends of said arms being adapted to be brought together for insertion through an opening with the portion of said arms intermediate said ends and cable encircling portion being stressed inwardly, there being offset portions formed in said stressed portions for yielding engagement with the walls of an opening.

2. A fastener for cables comprising an elongated strip of metal stock formed of resilient material, said strip being bent intermediate its ends to provide a cable encircling portion and support engaging arms, the material of said cable encircling portion being of greater width than the remainder of the strip, the free ends of said arms being adapted to be brought together for insertion into an opening, said arms being provided with offset portions intermediate the ends and cable encircling portion providing attachment shoulders to prevent the removal of said clip from said opening.

3. A spring cable fastener comprising a strip of metal stock formed of resilient spring material, said strip being provided with a cable encircling portion, said cable encircling portion being bowed slightly inwardly in cross section to prevent damage to the cable due to line contact therewith, said cable encircling portion terminating in a pair of parallel arms adapted when inserted into an opening of predetermined size to cause the free ends of the strip to bear against each other, and said arms being provided with offset portions intermediate the ends and cable encircling portion providing attachment shoulders to prevent the removal of said clip from said opening.

4. A spring cable fastener comprising an elongated strip of metal stock formed of resilient spring material, said strip being bent intermediate its ends to provide a cable encircling portion normally of greater diameter than the diameter of the cable to be secured, said cable encircling portion having an arcuate cross section to prevent damage to the cable at its edges, said cable encircling portion terminating in parallel arms having shoulders intermediate their ends and the cable encircling portion, said parallel arms adapted to be bowed to have their ends brought together for insertion into an opening in the support of predetermined size cable and being adapted to have their ends maintained in such engagement with each other by the action of the sides of said opening bearing against said shoulders whereby said parallel arms are permanently maintained in said opening against dislodgement, said cable encircling portion tightly gripping the cable and forcing the same by the action of said shoulders bearing against the walls of said opening against said support.

5. A fastener for cables or the like comprising a strip of metal stock formed of resilient material, said strip being bent intermediate its ends forming a cable encircling portion and support engaging arms, the free ends of said arms being adapted to be brought together for insertion into an opening and which reduces the diameter of said cable encircling portion, and said arms being provided with offset portions intermediate the ends and cable encircling portion providing attachment shoulders to prevent the removal of said fastener from said opening.

6. A fastener comprising an elongated strip of metal stock formed of resilient material, said strip being provided with a cable encircling portion, said cable encircling portion being bowed slightly inwardly in cross section to prevent damage to the cable due to sharp edge binding, said cable encircling portion terminating in a pair of support engaging arms adapted when inserted into an opening of predetermined size to cause the free ends of the strip to bear against each other and further causing the cable encircling portion to tightly grip said cable, and said arms having offset portions intermediate the ends and cable encircling portion providing yielding engagement with the walls of an opening.

JOHN H. VAN UUM.